United States Patent
Vo et al.

(10) Patent No.: US 9,604,589 B1
(45) Date of Patent: Mar. 28, 2017

(54) POLYMERIC BRACKET FOR INSTRUMENTAL PANEL SIDE PASSENGER KNEE PROTECTION

(71) Applicant: FORD GLOBAL TECHNOLOGIES, LLC, Dearborn, MI (US)

(72) Inventors: Tien Vo, Victoria (AU); Ming Loo, Victoria (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/926,018

(22) Filed: Oct. 29, 2015

(51) Int. Cl.
*B60R 21/045* (2006.01)
*B60R 21/00* (2006.01)
*B60R 21/04* (2006.01)
*B60R 21/02* (2006.01)

(52) U.S. Cl.
CPC .... *B60R 21/045* (2013.01); *B60R 2021/0051* (2013.01); *B60R 2021/0053* (2013.01); *B60R 2021/024* (2013.01); *B60R 2021/0414* (2013.01); *B60R 2021/0421* (2013.01)

(58) Field of Classification Search
CPC .......... B60R 21/045; B60R 2021/0051; B60R 2021/0053; B60R 2021/024; B60R 2021/0414; B60R 2021/0421; B62D 25/145
See application file for complete search history.

(56) References Cited

U.S. PATENT DOCUMENTS

| | | | | |
|---|---|---|---|---|
| 4,978,136 A * | 12/1990 | Tomita | ................... | B60R 21/045 280/751 |
| 5,096,223 A * | 3/1992 | Tekelly | ................. | B60R 21/045 280/748 |
| 5,273,314 A * | 12/1993 | Sakakibara | ........... | B60R 21/045 188/377 |
| 5,456,494 A * | 10/1995 | Witkovsky | ............ | B60R 21/045 188/377 |
| 5,489,116 A * | 2/1996 | Boag | ..................... | B60R 21/205 280/728.2 |
| 5,518,270 A * | 5/1996 | Hanada | ................. | B60R 21/045 280/748 |
| 5,577,770 A | 11/1996 | Sinner et al. | | |
| 5,632,507 A * | 5/1997 | Sinner | ................... | B60R 21/045 280/750 |
| 5,865,468 A * | 2/1999 | Hur | ....................... | B60R 21/045 188/377 |
| 5,951,045 A | 9/1999 | Almefelt et al. | | |

(Continued)

FOREIGN PATENT DOCUMENTS

JP      03000546 A * 1/1991
JP      07179162 A * 7/1995
(Continued)

OTHER PUBLICATIONS

Knee Protection, www.volkswagen.co.uk/technology, total 1 page.

*Primary Examiner* — Laura Freedman
(74) *Attorney, Agent, or Firm* — Mohr Intellectual Property Law Solutions, PC

(57) ABSTRACT

The present invention in one or more embodiments provides a polymeric bracket for instrument panel side passenger knee protection, the polymeric bracket including first and second legs spaced apart from each other and to support an instrument panel at an assembly position, and a waist connecting the first and second legs and to support a cross car beam at the assembly position.

20 Claims, 3 Drawing Sheets

(56) References Cited

U.S. PATENT DOCUMENTS

| | | | |
|---|---|---|---|
| 6,196,588 B1 * | 3/2001 | Sugawara | B60H 1/00028 180/90 |
| 6,213,504 B1 * | 4/2001 | Isano | B60R 21/045 280/748 |
| 6,296,277 B1 | 10/2001 | Bittinger et al. | |
| 6,609,727 B2 | 8/2003 | Figlioli et al. | |
| 6,793,246 B2 * | 9/2004 | Horsch | B60R 21/045 280/751 |
| 6,866,294 B2 * | 3/2005 | Horsch | B60R 21/045 280/752 |
| 6,883,833 B2 * | 4/2005 | Yamazaki | B60R 21/045 188/377 |
| 6,905,136 B2 * | 6/2005 | Vidal | B60R 21/055 280/752 |
| 7,204,515 B2 * | 4/2007 | Penner | B62D 25/145 188/377 |
| 7,275,764 B2 * | 10/2007 | Yamada | B60R 21/045 280/752 |
| 7,293,800 B2 * | 11/2007 | Abe | B60R 21/04 280/751 |
| 7,338,075 B2 * | 3/2008 | Ellison | B60R 21/045 280/752 |
| 7,441,806 B2 * | 10/2008 | Ellison | B60R 21/045 280/751 |
| 7,478,832 B2 * | 1/2009 | Kong | B60R 21/04 280/748 |
| 7,874,587 B2 | 1/2011 | Miki et al. | |
| 8,251,399 B2 | 8/2012 | Babian | |
| 8,267,428 B2 * | 9/2012 | DePue | B60R 21/02 280/751 |
| 8,414,015 B2 * | 4/2013 | Bristol | B60R 21/205 280/728.2 |
| 8,505,971 B2 * | 8/2013 | Arima | B60R 21/045 188/371 |
| 2006/0232055 A1 | 10/2006 | Cappabianca et al. | |

FOREIGN PATENT DOCUMENTS

| | | | |
|---|---|---|---|
| JP | 07323796 A | * | 12/1995 |
| JP | 08067224 A | * | 3/1996 |
| JP | 08164811 A | * | 6/1996 |
| JP | 2010047209 A | * | 3/2010 |
| JP | 2010083442 A | * | 4/2010 |

* cited by examiner

POLYMERIC BRACKET FOR INSTRUMENTAL PANEL SIDE PASSENGER KNEE PROTECTION

TECHNICAL FIELD

The present invention relates to a polymeric bracket for instrumental or instrument panel side passenger knee protection.

BACKGROUND

On a typical instrument panel, the structural support on the passenger side above the glovebox is often important for occupant knee protection upon an adverse impact.

Publication U.S. Pat. No. 6,609,727 discloses an energy absorbing knee bolster assembly for a vehicle, including a knee deflector for partially surrounding a steering column of the vehicle, where the knee deflector includes left and right energy absorbing knee bolster brackets on opposite sides of the knee deflector.

SUMMARY

In one or more embodiments, a polymeric bracket is provided for instrument panel side passenger knee protection, the polymeric bracket including first and second legs spaced apart from each other and to support an instrument panel at an assembly position, and a waist connecting the first and second legs and to support a cross car beam at the assembly position.

The first and second legs may define there-between first and second gaps spaced apart and differing in gap distance from each other.

At least one of the first and second legs and the waist may include a datum pin.

At least one of the first and second legs and the waist may define thereupon a fastener hole to at least partially receive a fastener there-through.

At least one of the first and second legs may include a first leg portion and a second leg portion positioned between the first leg portion and the waist along a longitudinal direction, the first leg portion includes a first outer wall and a first inner wall defining there-between a first width, the second leg portion includes a second outer wall and a second inner wall defining there-between a second width, and the second outer wall is positioned between the first outer wall and the first inner wall along a width direction.

The first width may be greater than the second width.

The first and second legs and the waist may be configured as a unitary one-piece.

The polymeric bracket may further include a bridge contacting the first and second legs and spaced apart from the waist.

The bridge may differ in material from the waist.

At least one of the first and second legs and the waist may define a through-aperture.

At least one of the first and second legs and the waist may include nylon.

The waist may further include a flange via which the waist is to be connected to an airbag bracket positioned on the cross bar beam.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

DETAILED DESCRIPTION OF ONE OR MORE EMBODIMENTS

Figure 1A:
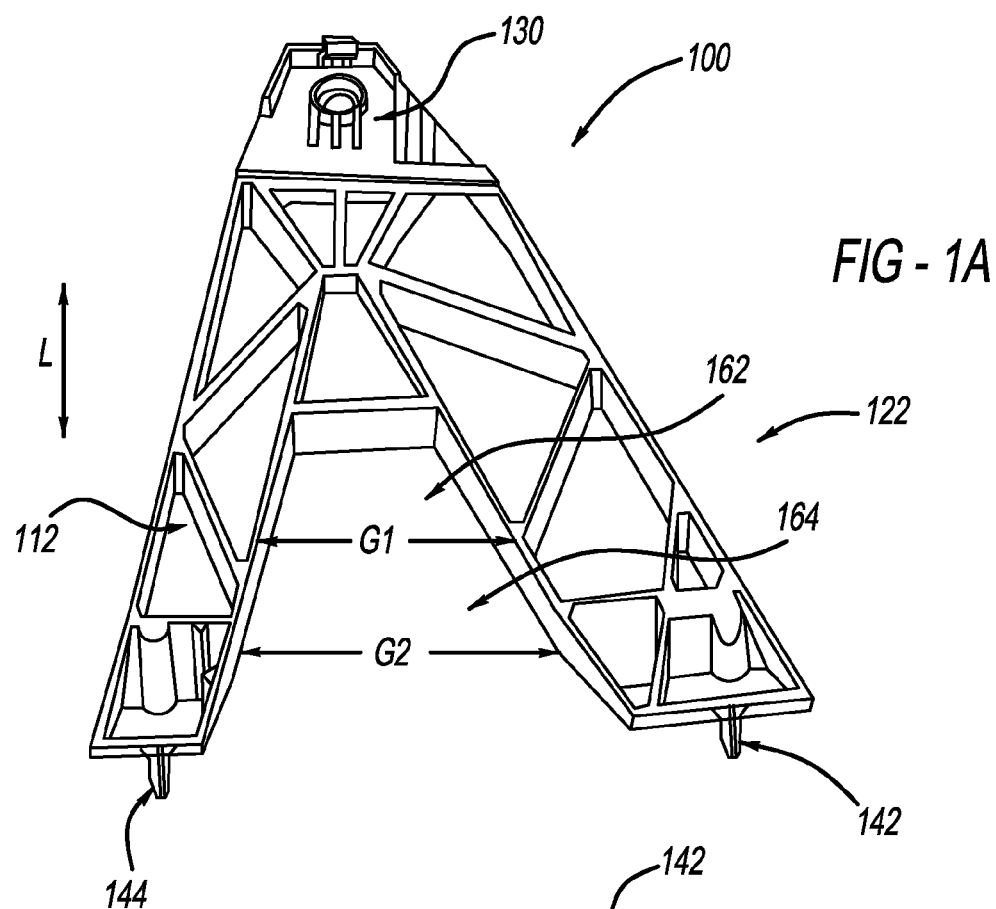
FIG. 1A illustratively depicts a perspective view of a polymeric bracket according to one or more embodiments of the present invention.

As referenced in the FIGS., the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is believed to be advantageous in at least reflecting the understanding of challenges associated with providing structural support to the instrument panel on the passenger side above the glovebox. The structural support is needed in order to meet certain requirements.

For instance, the glovebox door should stay relatively closed upon an adverse impact where the knee forms may push into the glovebox door. Consequently a lack of the support at or above the glovebox may induce the glovebox door to bend and open up upon the adverse impact, and unwanted injuries may result when the passenger knee impacts the area around the glovebox.

For instance also, during a passenger airbag deployment and as the airbag pushes through the glovebox door, the impact energy is likely to be transferred to the surrounding area of the instrument panel. This transfer of energy may cause the instrument panel to twist, the glovebox door may accordingly open, and unwanted injuries to the passenger may also result.

Yet for instance also, and during a passenger airbag deployment, a desirable structural stiffness of the instrument panel is important to ensure against unwanted movement, which helps permit the energy from the passenger airbag to be concentrated on the tear seam, resulting in a relatively clean tear or deployment of the seam.

Figure 1B:
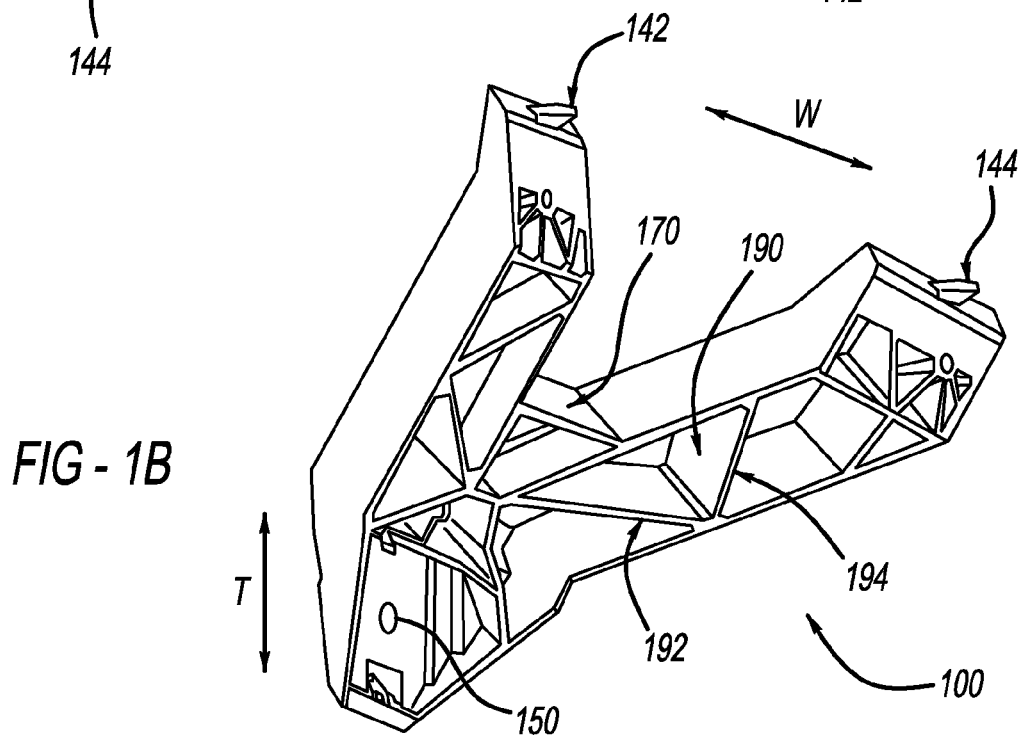
FIG. 1B illustratively depicts another perspective view of the polymeric bracket referenced in FIG. 1A.
Figure 3:
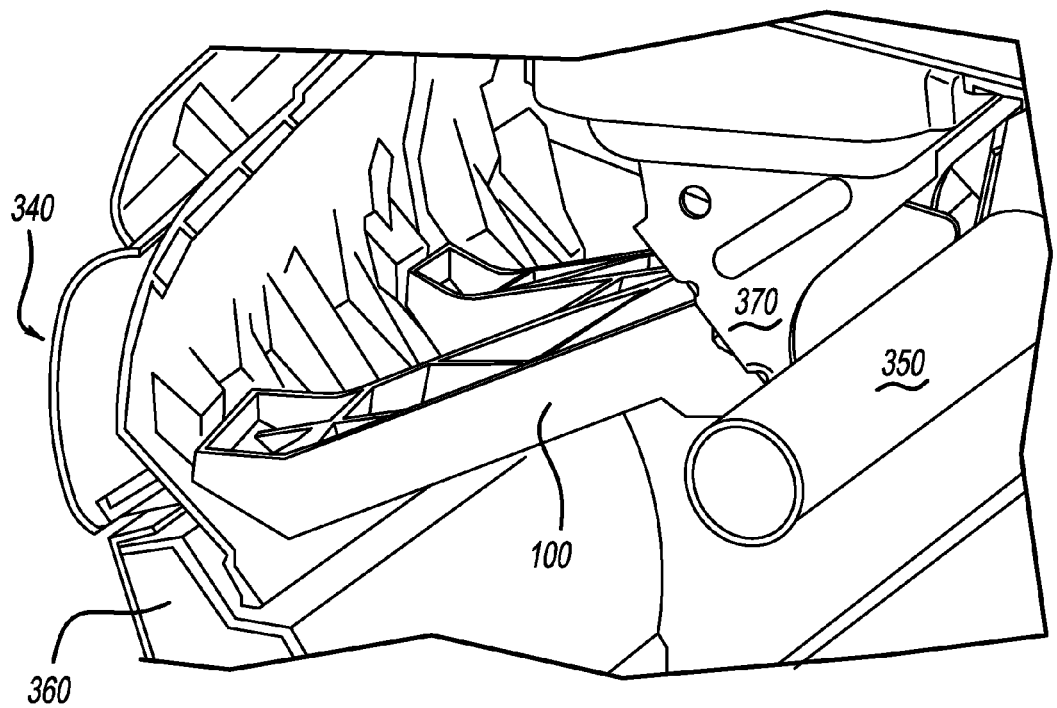
FIG. 3 illustratively depicts a perspective view of the polymeric bracket referenced in FIG. 1A through FIG. 2 as being positioned relative to an instrument panel and a cross car beam.
Figure 4:
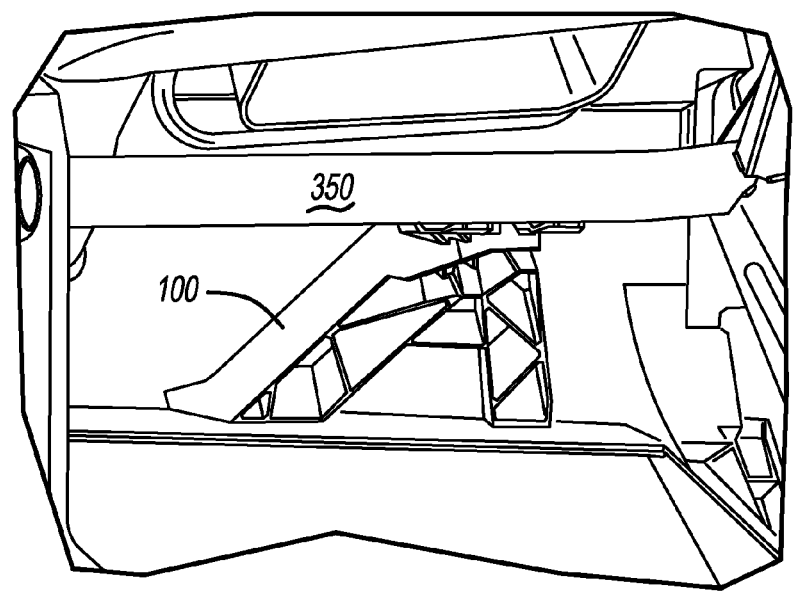
FIG. 4 illustratively depicts another perspective view of the polymeric bracket referenced in FIG. 3.

In one or more embodiments, and as illustratively depicted in FIG. 1A, FIG. 1B and further in view of FIG. 3 and FIG. 4, a polymeric bracket generally shown at 100 is provided for instrument panel side passenger knee protection, the polymeric bracket 100 including first and second legs 112, 122 spaced apart from each other along a width direction W and to support an instrument panel 340 at an assembly position such as the position depicted in FIG. 3 and FIG. 4, and a waist 130 connecting the first and second legs 112, 122 and to support a cross car beam 350 at the assembly position. In certain embodiments, the first and second legs 112, 122 are in direct contact with the instrument panel 340 and the cross car beam 350 for improved connection and stability. The width direction W may be positioned relative to a left-to-right width direction of the vehicle with an angle there-between of no greater than 45 degrees, 35 degrees, 25 degrees or 15 degrees. The left-to-right width direction of the vehicle may further be defined as a direction connecting the left and right rear-view mirrors of the vehicle.

The polymeric bracket 100 may alternatively be referred to as a boomerang shape plastic bracket, which is to be attached between the cross car beam 350 and the instrument panel 340 right above a glovebox 360. On the cross car beam 350 side, and as mentioned herein elsewhere, the attachment may be done to the same bracket where a passenger airbag is attached. On the instrument panel 340 side, each of the first and second legs 112, 122 of the polymeric bracket 100 may be attached to the instrument panel 340 via any suitable connectors such as screws. The position of each of the first and second legs 112, 122 should be chosen such that they are close to where the knee forms are expected to hit upon impact.

Referring back to FIG. 1A and FIG. 1B, the first and second legs 112, 122 may define there-between first and second gaps 162, 164 spaced apart from each other along the width direction W. The first gap 162 is of a first gap distance G1, the second gap 164 is of a second gap distance G2, and the second gap distance G2 is different than the first gap distance G1. In certain embodiments, and as illustratively depicted in FIG. 1A and FIG. 1B, the first gap 162 is positioned between the waist 130 and the second gap 164, with the first gap distance being smaller than the second gap distance G2. This configuration is believed to be advantageous in imparting a general "A" shape to the polymeric bracket 100 for enhanced assembly stability and energy absorption.

Referring back again to FIG. 1A and FIG. 1B, at least one of the first and second legs 112, 122 and the waist 130 may include a datum pin such as a datum pin 142 positioned on the second leg 122 and a datum pin 144 positioned on the first leg 112. The datum pin such as the datum pin 142, 144 may be readily formed as an integral part of the first and second legs 112, 122 via optionally injection molding. When desirable, more than one datum pins may be provided to the first leg 112 and/or the second leg 122. When desirable also, one or more datum pins may be provided to other parts such as the waist 130 of the polymeric bracket 100. Accordingly the polymeric bracket 100 may further be provided greater readiness for attachment and enhanced structural integrity.

By following this datum strategy, the polymeric bracket 100 may be located to the cross car beam 350 and the instrument panel 340 robustly and also help stabilize the whole area. The datum pins 142, 144 may be molded in as part of the standard injection molding process.

With further reference again to FIG. 1A and FIG. 1B, at least one of the first and second legs 112, 122 and the waist 130 may define thereupon a fastener hole such as a fastener hole 150 to receive a fastener (not shown). The fastener hole 150 may be alternative or in addition to the datum pin referenced herein elsewhere. For the waist 130 of the polymeric bracket 100, the fastener hole 150 may be configured to accommodate the fastener with relatively more robust sizes and dimensions so as to ensure a greater connection to the cross car beam 350. More than one fastener hole may be employed on any one of the first and second legs 112, 122 and the waist 130 for added connection as desirable.

The polymeric bracket 100 may be configured as at least partially collapsible to further reduce unwanted energy imparted onto the passenger knees in the event of a collisional impact. In certain embodiments, and as illustratively depicted in FIG. 2, a polymeric bracket 200 as a collapsible version of the polymeric bracket 100 may be configured as a stepped triangular design, where at least one of first and second legs 212, 222 includes a first leg portion 252 and a second leg portion 254 positioned between the first leg portion 252 and a waist 230 along a longitudinal direction L, the first leg portion 252 includes a first outer wall 256 and a first inner wall 258 defining there-between a first width W1 along the width direction W, the second leg portion 254 includes a second outer wall 260 and a second inner 262 wall defining there-between a second width W2, and the second outer wall 260 is positioned between the first outer wall 256 and the second inner wall 262 along the width direction W. The longitudinal direction L may be positioned relative to a head-to-tail length direction of the vehicle with an angle there-between of no greater than 45 degrees, 35 degrees, 25 degrees or 15 degrees. In certain particular embodiments, the second outer wall 260 is positioned between the first outer wall 256 and the first inner wall 258 along the width direction W.

Figure 2:
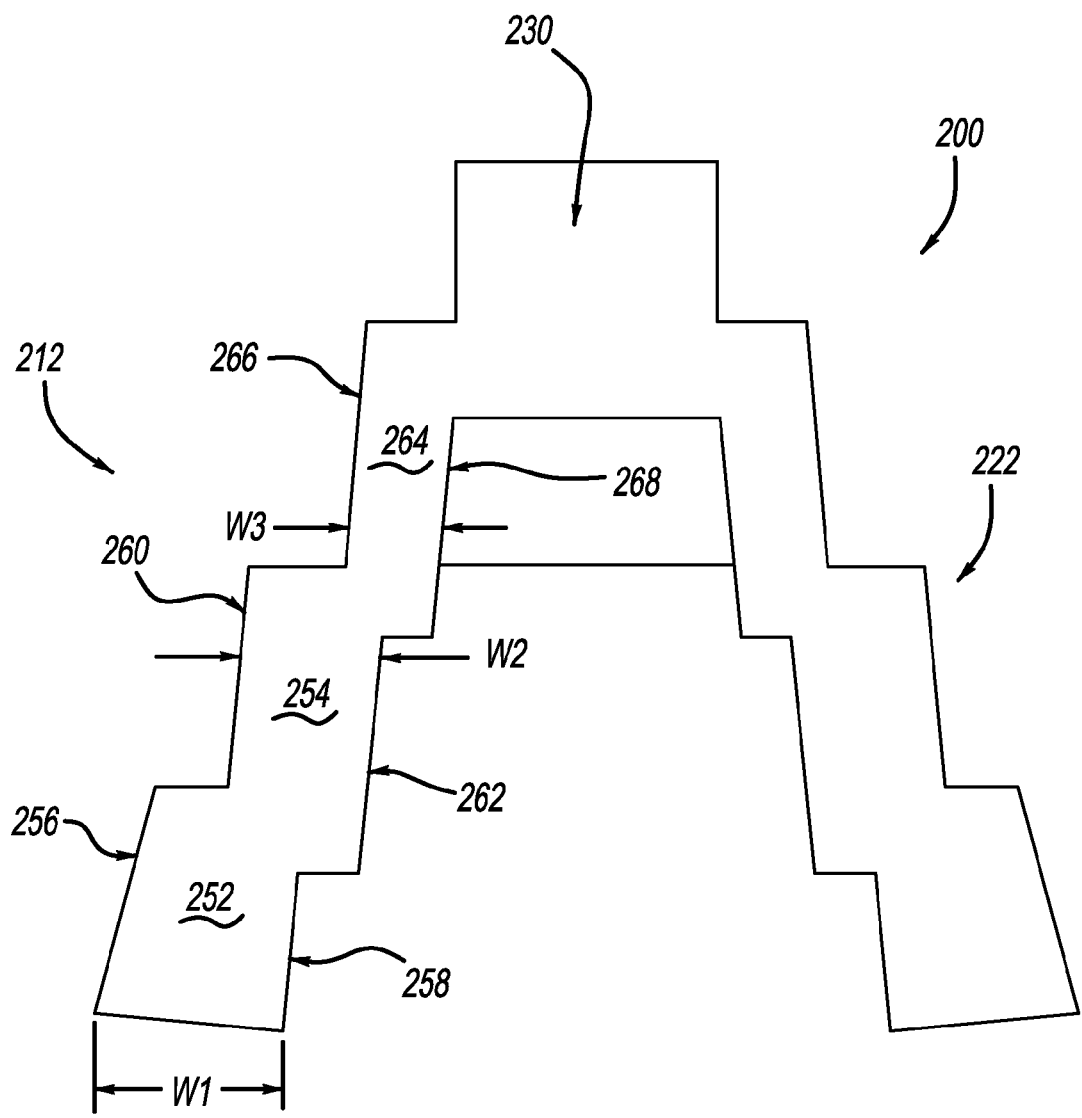
FIG. 2 illustratively depicts an alternative frontal view of the polymeric bracket referenced in FIG. 1A and/or FIG. 1B.

In certain embodiments, and as illustratively depicted in FIG. 2, a third or more leg portion 264 may be positioned between the waist 230 and the second leg portion 254 along the longitudinal direction L. The third leg portion includes a third outer wall 266 and a third inner wall 268 defining there-between a third width W3, and the third outer wall 266 is positioned between the second outer wall 260 and the third inner wall 268 along the width direction W. In certain particular embodiments, the third outer wall 266 is positioned between the second outer wall 260 and the second inner wall 262 along the width direction W.

In a non-limiting fashion, the stepped triangular design of the polymeric bracket 100 may be implemented to strategize energy absorption and to accommodate design variations dependent upon vehicle types. The steps may be collapsible but may need to resist certain forces coming from the passenger's knees. One or more of the structural features mentioned herein may be readily tuned dependent upon the vehicle type and the impact size.

Referring back to FIG. 2, the first width W1 may be designed to be greater than the second width W2. Accordingly, the first leg portion 252 may reasonably be expected to move relatively toward and absorb at least partially the second leg portion 254 upon an adverse impact. Similarly also the second width W2 may be designed to be greater than the third width W3. Accordingly also, the second leg portion 254 may be reasonably expected to move relatively toward and absorb at least partially the third leg portion 264.

The polymeric bracket 100, 200 may include or be formed of any suitable polymeric materials such as thermoplastic and/or thermoset polymers suitable for molding and injection molding in particular, with a non-limiting example thereof including a low cost talc filled polypropylene (PP) and ethylene propylene diene monomer (EPDM) rubber of a general formula of PP+EPDM optionally with talc filled at any suitable weight percent such as at around 10 to 30 weight percent, where EPDM may be included to increase ductility and avoid fracture upon an adverse impact. Another non-limiting example of the material included in or forming the polymeric bracket 100, 200 is nylon and its suitable variations.

The polymeric nature of the polymeric bracket 100, 200 makes it possible for the first and second legs 112, 122, 212, 222 and the waist 130, 230 to be configured as an integral and unitary one-piece in consideration for improved strength and greater cost efficiencies. The unitary structure may be realized via injection molding in any suitable form and process.

In certain embodiments, and as illustratively depicted in FIG. 1A and FIG. 1B, the polymeric bracket 100 may further include a bridge 170 contacting the first and second legs 112, 122 and being spaced apart from the waist 130. The bridge 170 may also be formed as an integral part of the polymeric bracket 100. The bridge 170 is believed to be beneficial in supporting the first and second legs 112, 122 and maintaining the overall structural integrity of the polymeric bracket 100.

In certain embodiments, the bridge 170 may differ in material from another part of the polymeric bracket 100 such as the waist 130, the first leg 112 or the second leg 122. The bridge 170 may include or be formed of a material more rigid or resistant to deformation in comparison to a material included in or forming the other part. The relatively greater rigidity is expected to enhance the supporting role of the bridge 170. Because the bridge 170 is supporting the first and second legs 112, 122 and therefore extends in a direction more parallel to the width direction W and less parallel to the longitudinal direction L. Accordingly the enhanced rigidity of the bridge 170 is not expected to impart any substantial impact to the passenger knees upon an adverse impact.

In certain embodiments, and as illustratively depicted in FIG. 1B, at least one of the first and second legs 112, 122 and the waist 130 defines a through-aperture 190 extending along a thickness direction T. This configuration is believed to further an overall weight reduction and enhance collapsibility when desirable. This configuration may be readily realized via injection molding during which one or more of the through-aperture 190 may be formed along with other parts of the polymeric bracket 100, 200.

Viewed alternatively, the through-aperture 190 may be defined by reinforcing ribs 192, 194, which are believed to be beneficial in providing added strength and stiffness, while the through-aperture 190 imparts weight reduction and effectuates cost efficiencies as mentioned herein elsewhere. The reinforcing ribs 192 194 may be formed along with the other structures of the polymeric bracket 100, 200 via injection molding.

In certain embodiments, the first leg 112, 212 differs from the second leg 122, 222 in dimension such as in length, width or thickness. This configuration may be beneficial in situations where the first and second legs may each sit at a different position of the cross car beam 350 and/or the instrument panel 340, which may vary according to vehicle types. The cross car beam 350 side of the attachment may also be where the passenger airbag is attached and therefore the polymeric bracket 100 may be attached to an airbag flange 370 to which the passenger airbag is located. The variable dimension of the first and second legs 112, 212, 122, 222 may also beneficially accommodate the design need in locating support where the passenger knees may come into contact the instrument panel upon an adverse impact.

In one or more embodiments, the present invention as set forth herein is believed to have overcome certain challenges associated with knee protection upon an adverse impact in a passenger compartment. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A polymeric bracket, comprising:
   first and second legs spaced apart from each other and to support an instrument panel at an assembly position;
   a waist connecting the first and second legs and to support a cross car beam at the assembly position; and
   a bridge contacting the first and second legs, being spaced apart from the instrument panel at the assembly position, and being more rigid in material than the waist.

2. The polymeric bracket of claim 1, wherein the first and second legs define there-between first and second gaps spaced apart and differing in gap distance from each other.

3. The polymeric bracket of claim 2, wherein the datum pin is integral in material to the at least one of the first and second legs and the waist.

4. The polymeric bracket of claim 1, wherein at least one of the first and second legs and the waist includes a datum pin.

5. The polymeric bracket of claim 1, wherein at least one of the first and second legs and the waist defines thereupon a fastener hole to at least partially receive a fastener therethrough.

6. The polymeric bracket of claim 1, wherein the first and second legs and the waist are a unitary one-piece.

7. The polymeric bracket of claim 1, wherein the bridge is spaced apart from the waist.

8. The polymeric bracket of claim 1, wherein at least one of the first and second legs and the waist defines thereupon a through-aperture.

9. The polymeric bracket of claim 1, wherein at least one of the first and second legs and the waist includes nylon.

10. The polymeric bracket of claim 1, wherein the waist further includes a flange via which the waist is to be connected to an airbag bracket positioned on the cross bar beam.

11. A polymeric bracket, comprising:
    first and second legs spaced apart from each other and to support an instrument panel at an assembly position, the first and second legs defining there-between first and second gaps spaced apart and differing in gap distance from each other; and
    a waist connecting the first and second legs and to support a cross car beam at the assembly position; and
    a bridge contacting the first and second legs and being spaced apart from the waist,
    wherein at least one of the first and second legs includes a first leg portion and a second leg portion positioned between the first leg portion and the waist along a longitudinal direction, the first leg portion includes a first outer wall and a first inner wall defining there-between a first width, the second leg portion includes a second outer wall and a second inner wall defining there-between a second width, and the second outer wall is positioned between the first outer wall and the first inner wall along a width direction, and wherein the first width is greater than the second width.

12. The polymeric bracket of claim 11, wherein the first and second legs and the waist are a unitary one-piece.

13. The polymeric bracket of claim 11, wherein the bridge is more rigid in material than the waist.

14. The polymeric bracket of claim 11, wherein at least one of the first and second legs and the waist includes a datum pin.

15. The polymeric bracket of claim 14, wherein the datum pin is integral in material to the at least one of the first and second legs and the waist.

16. The polymeric bracket of claim 11, wherein at least one of the first and second legs and the waist defines a through-aperture.

17. The polymeric bracket of claim 11, wherein at least one of the first and second legs and the waist defines thereupon a fastener hole to at least partially receive a fastener there-through.

18. A polymeric bracket for instrument panel side passenger knee protection, comprising: a waist connecting first and second legs, a bridge contacting the first and second legs and being spaced apart from an instrument panel at an assembly position, and wherein at least one of the first and second legs includes a first leg portion and a second leg portion positioned between the first leg portion and the waist along a longitudinal direction, the first leg portion includes a first outer wall and a first inner wall defining there-between a first width, the second leg portion includes a second outer wall and a second inner wall defining there-between a second width, and the second outer wall is positioned between the first outer wall and the first inner wall along a width direction, wherein the first width is greater than the second width.

19. The polymeric bracket of claim 18, wherein the first and second legs define there-between first and second gaps spaced apart and differing in gap distance from each other.

20. The polymeric bracket of claim 18, wherein at least one of the first and second legs and the waist includes a datum pin, and the datum pin is integral in material to the at least one of the first and second legs and the waist.

* * * * *